Patented Mar. 31, 1931

1,799,068

UNITED STATES PATENT OFFICE

KARL SCHNITZSPAHN, OF OFFENBACH-ON-THE-MAIN, GERMANY, ASSIGNOR TO GENERAL ANILINE WORKS INC., OF NEW YORK, N. Y., A CORPORATION OF DELAWARE

PROCESS FOR MANUFACTURING CONCENTRATED DIAZO SOLUTIONS FROM SOLID ARYL-DIAZONIUM-FLUOBORATES

No Drawing. Application filed April 5, 1929, Serial No. 352,895, and in Germany April 3, 1928.

The present invention relates to a process of manufacturing concentrated diazo solutions from solid aryl-diazonium-fluoborates of the benzene series.

The aryl diazonium fluoborates which were first described in the German Patent No. 281,055 and in Ber. d. Deutsch. Chem. Ges., vol. 60, pages 115 and 1186, show a solubility not in all cases satisfying the demand of the practice when they are employed as developing salts in dyeing and printing, especially for preparing insoluble dyestuffs on the fiber, i. e. the so-called ice-colors. Stronger diazo solutions than are hitherto obtainable by means of diazonium fluoborates are necessary for the printing process and in the case of dyeing on a standing bath for replenishing the partially exhausted bath.

I have found that diazo solutions, prepared from solid aryl-diazonium-fluoborates, of a concentration much higher than corresponding to the solubility of the diazonium fluoborate employed can be obtained in a simple manner by dissolving the diazonium fluoborate in an aqueous solution of metallic salts the metal of which has a greater affinity to the hydrofluoboric acid than to the acid residue of the salt, whereby in some cases difficultly soluble fluoboric metal salts may be separated. Suitable salts for the purpose of the present invention are salts of metals of the first and third group of the periodic system, for example aluminium chloride, alkali metal chlorides or salts or double salts of potassium (the acid residue of which forms a more soluble salt with the diazonium compound employed than the fluoborate residue). In special cases when acid diazo solutions are wanted, these salt solutions may also contain an acid. Besides the just mentioned salts increasing the solubility, other salts may further be present, such as sodium sulfate, aluminium sulfate or cupric sulfate.

The great and unexpected increase of the solubility of the diazonium fluoborates which is effected by my process depends probably upon the fact that the diazonium fluoborates, exceedingly stable in the dry state, undergo easily a double decomposition, when dissolved in the presence of a salt of the aforesaid kind. Thereby in some cases difficultly soluble fluoboric metal salts separate. When a potassium salt is used for this purpose, the double decomposition just mentioned is nearly quantitative and, as a further advantage of this case, the potassium fluoborate thus formed separates and may be easily recovered.

In order to further illustrate my invention the following examples are given, the parts being by weight and all temperatures in centigrade degrees, but I wish it to be understood that I am not limited to the particular products nor reaction conditions mentioned therein:

Example 1

100 parts of para-nitrophenyl-diazonium-fluoborate, prepared according to Ber. d. Deutsch. Chem. Ges., vol. 60, page 1189, are treated with a solution warmed to 20° of 230 parts of potassium chloride in 600 parts of water. The whole mass of para-nitrophenyl-diazonium-salt becomes dissolved. The concentration of the diazo solution thus obtained corresponds to 68 grs. of para-nitraniline (calculated on a molecular weight of 138) per liter. The potassium fluoborate separated may be filtered off.

If in comparison therewith 100 parts of the same diazonium fluoborate are treated at 20° with 830 parts of water until the solution is saturated, only 16,4 parts of the diazonium salt become dissolved and the concentration of the diazo solution thus obtained corresponds only to 10.4 grs. of para-nitraniline, of molecular weight 138, per liter.

Example 2

5 parts of 4-nitro-1-methyl-benzene-2-diazonium-fluoborate are stirred at 20° with 60 parts of a solution containing 13% of crystallized aluminium chloride. The concentration of the diazo solution thus formed corresponds at 20° to 25.9 grs. of 4-nitro-2-amino-1-toluene, of molecular weight 152, per liter whereas by means of pure water solutions are obtained corresponding only to 9,3 gr. of 4-nitro-2-amino-1-toluene per liter.

Example 3

When in the foregoing example the aluminium chloride solution is replaced by the same quantity of a potassium chloride solution of 10% strength, a diazo solution is obtained the concentration of which corresponds to 40 grs. of 4-nitro-2-amino-1-toluene, of molecular weight 152, per liter.

I claim:

1. A process which comprises dissolving a solid aryl diazonium fluoborate of the benzene series in an aqueous solution of salts of metals the metal of which has a greater affinity to the hydrofluoboric acid than to the acid residue of the salt, whereby difficultly soluble fluoboric metal salts may be separated.

2. A process which comprises dissolving a solid aryl diazonium fluoborate of the benzene series in an aqueous solution of salts of metals of the first group of the periodic system the metal of which has a greater affinity to the hydrofluoboric acid than to the acid residue of the salt, whereby difficultly soluble fluoboric metal salts may be separated.

3. A process which comprises dissolving a solid aryl diazonium fluoborate of the benzene series in an aqueous solution of a potassium salt.

4. A process which comprises dissolving a solid aryl diazonium fluoborate of the benzene series containing a nitro group in an aqueous solution of salts of metals the metal of which has a greater affinity to the hydrofluoboric acid than to the acid residue of the salt, whereby difficultly soluble fluoboric metal salts may be separated.

5. A process which comprises dissolving a solid aryl diazonium fluoborate of the benzene series containing a nitro group in an aqueous solution of salts of metals of the first group of the periodic system, the metal of which has a greater affinity to the hydrofluoboric acid than to the acid residue of the salt, whereby difficultly soluble fluoboric metal salts may be separated.

6. A process which comprises dissolving a solid aryl diazonium fluoborate of the benzene series containing a nitro group in an aqueous solution of a potassium salt.

7. A process which comprises dissolving a solid 4-nitro-1-methyl-benzene-2-diazonium-fluoborate in an aqueous solution of inorganic salts of metals, the metal of which has a greater affinity to the hydrofluoboric acid than to the acid residue of the salt, whereby difficultly soluble fluoboric metal salts may be separated.

8. A process which comprises dissolving a solid 4-nitro-1-methyl-benzene-2-diazonium-fluoborate in an aqueous solution of inorganic salts of metals of the first group of the periodic system the metal of which has a greater affinity to the hydrofluoboric acid than to the acid residue of the salt, whereby difficultly soluble fluoboric metal salts may be separated.

9. A process which comprises dissolving a solid 4-nitro-1-methyl-benzene-2-diazonium-fluoborate in an aqueous solution of an organic potassium salt.

10. A process which comprises dissolving a solid 4-nitro-1-methyl-benzene-2-diazonium-fluoborate in an aqueous solution of chlorides of metals of the first group of the periodic system the metal of which has a greater affinity to the hydrofluoboric acid than to the acid residue of the salt, whereby difficultly soluble fluoboric metal salts may be separated.

11. A process which comprises dissolving a solid 4-nitro-1-methyl-benzene-2-diazonium fluoborate in an aqueous solution of potassium chloride.

In testimony whereof, I affix my signature.

KARL SCHNITZSPHAN.

CERTIFICATE OF CORRECTION.

Patent No. 1,799,068.            Granted March 31, 1931, to

KARL SCHNITZSPAHN.

It is hereby certified that error appears in the printed specification of the above numbered patent requiring correction as follows: Page 2, lines 71 and 72, claim 9, for the word "organic" read inorganic; and that the said Letters Patent should be read with this correction therein that the same may conform to the record of the case in the Patent Office.

Signed and sealed this 5th day of May, A. D. 1931.

(Seal)                                               M. J. Moore,
                                                    Acting Commissioner of Patents.